(12) United States Patent
Raffy

(10) Patent No.: US 10,494,308 B2
(45) Date of Patent: Dec. 3, 2019

(54) MELTED MAGNESIUM ALUMINATE GRAIN RICH IN MAGNESIUM

(71) Applicant: SAINT-GOBAIN CENTRE DE RECHERCHES ET D'ETUDES EUROPEEN, Courbevoie (FR)

(72) Inventor: Stéphane Raffy, Cavaillon (FR)

(73) Assignee: SAINT-GOBAIN CENTRE DE RECHERCHES ET D'ETUDES EUROPEAN, Courbevoie (FR)

( * ) Notice: Subject to any disclaimer, the term of this patent is extended or adjusted under 35 U.S.C. 154(b) by 0 days.

(21) Appl. No.: 15/759,679

(22) PCT Filed: Sep. 14, 2016

(86) PCT No.: PCT/FR2016/052317
§ 371 (c)(1),
(2) Date: Mar. 13, 2018

(87) PCT Pub. No.: WO2017/046517
PCT Pub. Date: Mar. 23, 2017

(65) Prior Publication Data
US 2019/0039956 A1    Feb. 7, 2019

(30) Foreign Application Priority Data

Sep. 14, 2015 (FR) ...................... 15 58569

(51) Int. Cl.
| | |
|---|---|
| *C04B 35/44* | (2006.01) |
| *C04B 35/443* | (2006.01) |
| *C01F 7/16* | (2006.01) |
| *C04B 35/053* | (2006.01) |
| *C04B 35/653* | (2006.01) |

(Continued)

(52) U.S. Cl.
CPC ............ *C04B 35/443* (2013.01); *C01F 5/02* (2013.01); *C01F 7/162* (2013.01); *C04B 35/053* (2013.01);

(Continued)

(58) Field of Classification Search
CPC .......... C01F 5/02; C01F 7/162; C04B 35/053; C04B 35/6262; C04B 35/653
See application file for complete search history.

(56) References Cited

U.S. PATENT DOCUMENTS 3,993,119 A    11/1976  Scott
6,723,442 B1    4/2004  Decker et al.

FOREIGN PATENT DOCUMENTS

DE    102 57 001 A1    6/2004
JP          63307107 A  * 12/1988   ............... C01F 5/02

(Continued)

OTHER PUBLICATIONS

Jastrzębska et al. Influence of Hydration on Transport and Storage of Spinel-Based Refractory Raw Materials. Logistyka, No. 4, 4372-4379. 2014.*

(Continued)

*Primary Examiner* — Noah S Wiese
(74) *Attorney, Agent, or Firm* — Pillsbury Winthrop Shaw Pittman LLP

(57) ABSTRACT

A fused grain is essentially composed of a matrix of a magnesium aluminum oxide of $MgAl_2O_4$ spinel structure and/or of the $MgO$—$MgAl_2O_4$ eutectic structure, and of inclusions essentially composed of magnesium oxide. The grain has the following overall chemical composition, as percentages by weight, expressed in the form of oxides: more than 5.0% and less than 19.9% of $Al_2O_3$, $Al_2O_3$ and MgO together represent more than 95.0% of the weight of the grain. The cumulative content of CaO and of $ZrO_2$ is less than 4000 ppm, by weight.

15 Claims, 1 Drawing Sheet

(51) Int. Cl.
C01F 5/02 (2006.01)
C04B 35/626 (2006.01)

(52) U.S. Cl.
CPC ........ *C04B 35/6262* (2013.01); *C04B 35/653* (2013.01); *C01P 2002/32* (2013.01); *C01P 2004/61* (2013.01); *C01P 2004/82* (2013.01); *C01P 2006/80* (2013.01); *C04B 2235/3201* (2013.01); *C04B 2235/3206* (2013.01); *C04B 2235/3208* (2013.01); *C04B 2235/3222* (2013.01); *C04B 2235/3244* (2013.01); *C04B 2235/3267* (2013.01); *C04B 2235/3272* (2013.01); *C04B 2235/3418* (2013.01); *C04B 2235/5436* (2013.01); *C04B 2235/72* (2013.01); *C04B 2235/725* (2013.01); *C04B 2235/763* (2013.01); *C04B 2235/785* (2013.01); *C04B 2235/80* (2013.01); *C04B 2235/85* (2013.01)

(56) References Cited

FOREIGN PATENT DOCUMENTS

| | | |
|---|---|---|
| JP | S63-307107 A | 12/1988 |
| WO | WO 2004/030131 A2 | 4/2004 |
| WO | WO 2008/025440 A1 | 3/2008 |

OTHER PUBLICATIONS

International Search Report as issued in International Patent Application No. PCT/FR2016/052317, dated Nov. 25, 2016.

Ding, J., et al., "Preparation and Hydration Resistance of MgO—MgAl$_2$O$_4$ Composite Refractory," Advanced Materials Research vols. 399-401, 2012, pp. 851-854, XP009181072; Fig 5, Table 1.

Jastrzebska, I., et al., "Influence of Hydration on Transport and Storage of Spinel-Based Refractory Raw Materials," Logistyka—nauka, vol. 4, No. CD6, 2014, pp. 4372-4379, XP055283995.

* cited by examiner

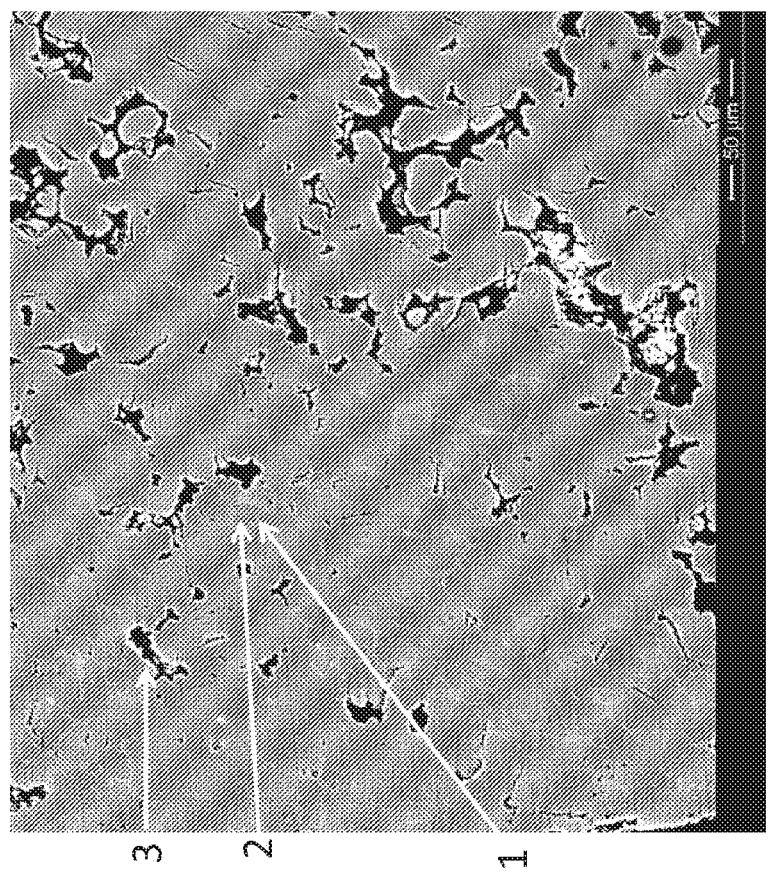

MELTED MAGNESIUM ALUMINATE GRAIN RICH IN MAGNESIUM

CROSS-REFERENCE TO RELATED APPLICATIONS

This application is the U.S. National Stage of PCT/FR2016/052317, filed Sep. 14, 2016, which in turn claims priority to French patent application number 1558569 filed Sep. 14, 2015. The content of these applications are incorporated herein by reference in their entireties.

The invention relates to grains for ceramic applications essentially composed of oxides of the elements Al and Mg in the form of magnesium-rich magnesium aluminate, often known as MMA in the field. The invention also relates to a process for the manufacture of such grains, and also to ceramic materials, products or coatings formed from said grains, often known as MMA ceramics. Such materials have an application in particular, but not solely, in the manufacture of SOFC tubes, or also in the manufacture of supports for the separation of gases. Such materials can also be used in the preparation of refractory parts for the manufacture or conversion of metals or metal alloys. They can also be used as coating for metal parts or also in the cases of contact between a ceramic part and a metal.

One of the essential characteristics which has enabled the use of MMA ceramics in numerous technical fields is their thermal expansion coefficient (TEC). In particular, studies carried out previously have shown that the thermal expansion coefficient of MMA ceramics was similar or very close to that of metals and that, in addition, the thermal expansion coefficient could be adjusted, as a function of the chemical composition of the ceramic material and of its microstructure, to correspond precisely to that of the metal with which it is in contact. Reference may be made, on this subject, for example, to the patent application WO 2004/030131 or to the U.S. Pat. No. 6,723,442 B1.

Another characteristic of MMA ceramics for use at high temperature, is their dimensional stability and in particular their creep strength. Creep is understood to mean, within the meaning of the present invention, the ability of the material to deform under the effect of the stresses experienced when it is subjected to high temperatures.

However, MMA ceramics are difficult to form in the aqueous phase due to their sensitivity to water. Specifically, in the presence of water, the crystalline phases of the precursors customarily used to obtain MMA ceramics are converted into an $Mg(OH)_2$ brucite phase which appears at the expense of the MgO periclase phase. In the end, the presence of an excessively large initial amount of this brucite phase makes it difficult or even impossible to form the product.

Thus, the present invention relates to fused grains of MMA type that can be used for manufacturing ceramic parts or coatings that can be more easily formed in the aqueous phase.

According to another aspect of the present invention, said ceramic parts or coatings may have a creep strength that is substantially improved, with respect to the current prior art. Studies carried out by the applicant company have indeed been able to demonstrate a connection between the content of certain impurities of the grains and the final performance of the creep strength of the ceramic material obtained from these grains.

More specifically, the present invention relates to a fused grain (or to a mixture of fused grains) essentially composed of a matrix of a magnesium aluminum oxide of $MgAl_2O_4$ spinel structure and/or of the $MgO$—$MgAl_2O_4$ eutectic structure, and of inclusions essentially composed of magnesium oxide, said inclusions being included in said matrix, said grain having the following overall chemical composition, as percentages by weight, expressed in the form of oxides:

more than 5.0% and less than 19.9% of $Al_2O_3$, $Al_2O_3$ and MgO together represent more than 95.0% of the weight of said grain, said grain being characterized in that the cumulative content of CaO and of $ZrO_2$ is less than 4000 ppm, by weight.

More particularly, in a fused grain according to the invention, the matrix phase of magnesium aluminum oxide of $MgAl_2O_4$ spinel structure and/or of the $MgO$—$MgAl_2O_4$ eutectic structure therefore coats said inclusions essentially composed of magnesium oxide, as can be seen in the appended electron microscopy photograph. It is considered that such a structure makes it possible to ensure the cohesion of the grain and its resistance to hydration.

The grain according to the invention can comprise, in particular in the form of impurities, up to 5% of other oxides.

Preferably, the cumulative content of CaO and of $ZrO_2$ is less than 3500 ppm, more preferably less than 3000 ppm, and very preferably less than 2500 ppm by weight. Cumulative content is understood to mean the sum of the contents of CaO and of $ZrO_2$ in the fused grains.

Preferably, the content of CaO is less than 3500 ppm, more preferably less than 3000 ppm, indeed even less than 2500 ppm, indeed even less than 2000 ppm, and very preferably less than 1500 ppm by weight.

Preferably, the content of $ZrO_2$ is less than 3000 ppm, more preferably less than 2000 ppm, indeed even less than 1500 ppm, indeed even less than 1000 ppm, indeed even less than 500 ppm, and very preferably less than 200 ppm by weight.

Preferably, the fused grain according to the invention does not comprise an alumina $Al_2O_3$ structural phase.

Preferably, the cumulative content of BaO and of SrO is less than 3000 ppm, more preferably less than 2500 ppm, and very preferably less than 2000 ppm by weight. Cumulative content is understood to mean the sum of the contents of BaO and of SrO in the fused grains.

Preferably, the content of BaO is less than 2500 ppm, more preferably less than 2000 ppm, indeed even less than 1500 ppm, and indeed even less than 1000 ppm by weight.

Preferably, the content of SrO is less than 2500 ppm, more preferably less than 2000 ppm, indeed even less than 1500 ppm, and indeed even less than 1000 ppm by weight.

Preferably, the content of $Na_2O$ is less than 2500 ppm, more preferably less than 500 ppm, indeed even less than 300 ppm.

Preferably, the content of $Fe_2O_3$ is less than 1000 ppm, more preferably less than 500 ppm, indeed even less than 750 ppm, indeed even less than 500 ppm by weight.

Preferably, the content of $MnO_2$ is less than 500 ppm, more preferably less than 300 ppm, indeed even less than 200 ppm, and indeed even less than 100 ppm by weight.

Preferably, the content of $SiO_2$ is less than 500 ppm, and more preferably less than 200 ppm by weight.

According to one embodiment, the content of $TiO_2$ is less than 500 ppm by weight.

According to one embodiment, $Al_2O_3$ represents more than 8.0% of the weight, indeed even more than 10.0%, and indeed even more than 12.0% of the weight of said grain. $Al_2O_3$ can represent less than 19.5% of the weight of said grain, indeed even less than 19.0%, indeed even less than 18.0% or even less than 17.0% of the weight of said grain.

Preferably, $Al_2O_3$ and MgO together represent more than 96.0% of the weight of said grain. Preferably again, $Al_2O_3$ and MgO together represent more than 97.0%, indeed even more than 98.0%, indeed even more than 99.0%, or even more than 99.2% and very preferably at least 99.4% of the weight of said grain.

Preferably, the matrix of the fused grain according to the invention is composed of separate regions of spinel structure and/or of the $MgO$—$MgAl_2O_4$ eutectic structure.

The fused grain according to the invention comprises fine inclusions essentially composed of calcium and zirconium oxides, the largest dimension of which is less than 2 micrometers, preferably less than 1 micrometer, on an electron microscopy photograph.

In particular, the cumulative sum of said calcium and zirconium oxides may represent more than 80% of the weight of said inclusions and preferably more than 90%, indeed even more than 95% of the weight of said inclusions, such as for example measured by EPMA.

The present invention also relates to the ceramic material obtained by sintering fused grains as described above or by sintering a mixture comprising fused grains as described above, for example in the form of a ceramic part or of a ceramic coating.

Such a material is characterized in particular in that it can comprise fine inclusions essentially composed of calcium and zirconium oxides, the number of which is less than 100 per 10 000 square micrometers, on an electron microscopy photograph.

The present invention relates in particular to a mixture of fused grains as described above.

According to a first embodiment, the mixture of fused grains has a median particle size $d_{50}$, as measured by laser particle size analysis, of between 0.1 and 150 microns, in particular between 1 and 100 microns, indeed even between 2 and 70 microns, more particularly between 0.1 and 50 microns. According to another embodiment, in certain applications, the median particle size $d_{50}$, as measured by laser particle size analysis, is between 20 and 150 microns.

In yet other applications, for example for the manufacture of refractory products, the median particle size $d_{50}$ may range up to 5 millimeters. It is for example between 1 micron and 5 millimeters, indeed even between 50 microns and 2 millimeters. It is for example between 500 microns and 5 millimeters.

The invention relates in particular to a mixture of fused grains as described above.

The invention relates in particular to a mixture of fused grains having a median particle size $d_{50}$ of between 1 and 150 microns, in particular between 1 and 50 microns, said grains comprising less than 50% by weight of magnesium hydroxide, after immersing 5 grams of said mixture in 25 $cm^3$ of distilled water with stirring and at ambient temperature (25° C.) for two hours.

Within the meaning of the present invention, the following definitions and indications are given:

In accordance with the practices in the field of ceramics, the chemical composition of the grains, in particular according to the main constituent elements Al and Mg, is given in the present description, unless explicitly mentioned otherwise, with reference to the corresponding simple oxides $Al_2O_3$ or MgO, even if said element is not present or is present only partially in this form. It is the same for the impurities present in the grains, the content of which is given with reference to the oxide of the corresponding element, even if said element is actually present in another form in said grains. In addition, such a description is in accordance with the data usually supplied by the elemental chemical analysis according to the X-ray fluorescence devices ordinarily used to determine the elemental composition of the materials.

"$MgO$—$MgAl_2O_4$ eutectic" is understood to mean the MgO-spinel eutectic structure corresponding to the composition point, by weight, in the vicinity of 55% of $Al_2O_3$ and 45% of MgO and with the temperature in the vicinity of 2000° C. in the $MgO$—$Al_2O_3$ phase diagram (invariant point of the phase diagram for which the liquid to solid reaction is complete).

"Fused grain" conventionally refers to a grain obtained by a manufacturing process comprising at least a step of melting an initial mixture of starting materials, a solidification step and a grinding step.

"Melting" an initial mixture of starting materials refers to a heat treatment at a high enough temperature for all the constituents of the initial mixture to be in the molten (liquid) state.

"Impurities" is understood to mean in particular the unavoidable constituents necessarily introduced with the starting materials. The impurities are introduced by the starting materials during the preliminary step of manufacturing the fused grains.

The main impurities depend, of course, on the starting materials used, generally commercial MgO or $Al_2O_3$ powders with a purity greater than or equal to 95% by weight of the oxide. The main impurities detectable in the grain or the material according to the invention are generally and essentially the oxides of calcium, iron, silicon, manganese, sodium, zirconium or else titanium.

The chemical analysis of the material obtained by sintering fused grains according to the invention is substantially identical to that of said fused grains. Thus, the various elements constituting the microstructure of the material obtained by sintering fused grains according to the invention are substantially identical to those of said fused grains.

"Sintering" refers conventionally, in the field of ceramics, to a consolidation by heat treatment of a granular agglomerate, optionally with partial or complete melting of some of the constituents of said agglomerate, but without melting of at least one of its constituents.

The sintering according to the invention is normally carried out in the exclusively solid phase, and in particular all of the constituents of the fused grains remain in the solid phase during said sintering.

According to the invention, the sintering temperature of the fused grains is normally between 1200° C. and 1650° C. A process for manufacturing the grains described above comprises the following steps:

a) mixing the starting materials, in particular magnesium oxide and aluminum oxide or a precursor thereof, in order to form the starting feedstock;

b) melting the starting feedstock until the molten liquid is obtained;

c) cooling said molten liquid so that the molten liquid is completely solidified, for example in less than 3 minutes;

d) grinding said solid mass so as to obtain a mixture of fused grains.

According to the invention, the starting materials are chosen in step a) so that the fused grains obtained in step d) are in accordance with the invention.

Of course, without departing from the scope of the invention, any other conventional or known process for manufacturing fused grains may also be used, provided that the composition of the starting feedstock makes it possible to obtain grains having a composition in accordance with that of the grains of the invention.

In step b), use is preferably made of an electric arc furnace but all known furnaces can be envisaged, such as an induction furnace or a plasma furnace, provided that they make it possible to completely melt the starting feedstock. Melting is preferably carried out under neutral conditions, for example under argon, or oxidizing conditions, preferably at atmospheric pressure. As indicated above, step b) is carried out at a temperature that enables the complete melting of the starting feedstock. Such a temperature is greater than that of the MgO—MgAl$_2$O$_4$ eutectic, that is to say at a temperature greater than 2000° C., more preferably greater than 2050° C.

In step c), the cooling can be rapid, that is to say that the molten liquid is completely solidified in less than 3 minutes. Preferably, it results from casting in CS molds, such as described in the U.S. Pat. No. 3,993,119, or from quenching or else by a blowing technique.

In step d), the solid mass is ground, according to conventional techniques, until the size of the grains suitable for the envisaged application is obtained. For example, the grinding can be continued until grains are obtained that have a median particle size $d_{50}$, as measured by laser particle size analysis, for example of between 2 and 50 microns, indeed even between 0.1 and 50 microns in certain applications or between 20 and 150 microns in other applications (for example thermal spraying) or even up to 5 millimetres for applications such as the manufacture of refractory materials.

BRIEF DESCRIPTION OF THE DRAWING

The FIGURE is an electron microscopy photograph taken on a fused grain obtained according to the invention.

The invention and its advantages will be better understood on reading the following nonlimiting examples. In the examples, unless otherwise indicated, all the percentages and also the ppm (parts per million) are given by weight.

EXAMPLE 1

In this comparative example, a mixture is prepared from the following commercial starting materials:
a magnesium oxide powder having the following chemical analysis (in percentages by weight): MgO≥99%; CaO≤0.1%; Na$_2$O≤0.1%; SiO$_2$≤0.05%; ZrO$_2$≤0.02%; Fe$_2$O$_3$≤0.02%;
an aluminum oxide powder with Al$_2$O$_3$≥99% (by weight) having the following impurities (in percentages by weight): Na$_2$O: 0.23%, CaO<0.02%, MgO<0.05%, Fe$_2$O$_3$<0.02%, SiO$_2$<0.05%, ZrO$_2$<0.02%, TiO$_2$<0.02%.

The mixture is formed solely from these two commercial powders mixed in an MgO/Al$_2$O$_3$ weight ratio of 84.3/15.7; then co-ground until a median particle size $d_{50}$, as measured by laser particle size analysis, of the order of 3.4 micrometers is obtained.

The elemental analysis by X-ray fluorescence of the mixture thus obtained makes it possible to determine, with a relative uncertainty of the order of 1%, the concentrations of oxides. The mixture has a content of aluminum oxide of 15.7 weight percent and a content of magnesium oxide of 84.2 weight percent. The impurities detected are calcium (700 ppm of CaO equivalent) and sodium (400 ppm of Na$_2$O equivalent); the other species being below the detection thresholds of the measurement device, including iron (<200 ppm of Fe$_2$O$_3$ equivalent), silicon (<500 ppm of SiO$_2$ equivalent), zirconium (<500 ppm of ZrO$_2$ equivalent) and titanium (<120 ppm of TiO$_2$ equivalent).

The composition of the mixture thus obtained is determined according to the following protocol:
Phase analysis: Analysis of the sample by x-ray diffraction makes it possible to identify the various crystalline phases of the sample. It is carried out using the EVA® software and the PDF-2 database (2005 version) of the ICDD. The proportions of the various phases are then determined by the Rietveld method using the HighScore Plus 4.0 software (PANalytical B.V.). The .cif files of the "Inorganic Crystal Structure Database": ICSD #9863 (for MgO periclase), #203212 (for Mg(OH)$_2$ brucite), #51687 (for Al$_2$O$_3$ corundum), and #22354 (for MgAl$_2$O$_4$ spinel) are used as starting point for the refinement. The Bragg peaks are modelled with "pseudo-Voigt" functions.

The phase analysis carried out on the mixture obtained at the end of the co-grinding shows that this mixture is essentially composed of an MgO periclase phase and an Al$_2$O$_3$ corundum phase.

The resistance to hydration of the mixture prepared as described above is measured according to the following protocol:
A preliminary phase analysis is carried out on the sample. The resistance to hydration is measured by placing 5 grams of the mixture in 25 cm$^3$ of distilled water with stirring and at ambient temperature for two hours. The sample is then dried for 24 hours at 110° C. before a new phase analysis and a weighing. The comparison of the two phase analyses according to the protocol described above and of the weighings before and after the hydration test make it possible to determine the sensitivity of the sample to hydration according to the following two criteria:
the more the brucite phase appears, the more sensitive the sample,
the higher the mass is above 5 grams, the more hydrated the sample and therefore the more sensitive the sample to hydration.

The results obtained for the comparative sample according to this example 1 are given in table 1 below.

EXAMPLE 2 (ACCORDING TO THE INVENTION)

In this example according to the invention, fused grains are prepared by melting starting from the commercial starting materials used in example 1, mixed in an MgO/Al$_2$O$_3$ weight ratio of the order of 85/15.

The powder mixture is this time melted in an arc furnace at a temperature of the order of 2100 to 2300° C. The molten liquid is solidified and cooled. The fused product is then ground until a powder of fused grains is obtained having a median particle size $d_{50}$, as measured by laser particle size analysis, of the order of 2.9 micrometers and having a particle size distribution similar to that of example 1.

An elemental analysis by X-ray fluorescence of the fused grains thus obtained makes it possible to determine, as in example 1, the concentrations of the elemental oxides.

The grains have a content of aluminum oxide of 15.7 weight percent and a content of magnesium oxide of 84.2 weight percent. The impurities detected are calcium (1200 ppm of CaO equivalent); the other species being below the detection thresholds of the measurement device: iron (<200 ppm of Fe$_2$O$_3$ equivalent), silicon (<500 ppm of SiO$_2$ equivalent), zirconium (<500 ppm of ZrO$_2$ equivalent) and titanium (<100 ppm of TiO$_2$ equivalent).

The phase analysis, carried out on the mixture of grains according to the protocol described above, shows that these grains are essentially composed of an MgO periclase phase and an $MgAl_2O_4$ spinel phase.

Provided in the appended figure is an electron microscopy photograph taken on a fused grain obtained according to the invention: a very particular structure is observed, in which zones 1 composed of the $MgAl_2O_4$ spinel and/or MgO—$MgAl_2O_4$ eutectic phase encompass, in a matrix structure, grains 2 composed essentially of the MgO periclase phase, as was able to be demonstrated directly by elemental analysis using the Castaing microprobe (also known as electron probe microanalyser, EPMA). The darkest zones 3 on the photograph correspond to the porous zones of the structure.

The resistance to hydration of the fused grains thus prepared is measured according to the same protocols as described above in connection with example 1.

The results obtained are given in table 1 below.

TABLE 1

| | | Example 1 | Example 2 |
|---|---|---|---|
| initial mass | | 5 grams | 5 grams |
| Mass after hydration test | | 5.9 grams (+18%) | 5.7 grams (+14%) |
| Phases after hydration test | MgO magnesium oxide | 36% | 50% |
| | $MgAl_2O_4$ spinel | | 15% |
| | $Al_2O_3$ alumina | 12% | |
| | $Mg(OH)_2$ brucite | 52% | 35% |

The results given in table 1 above show the advantages linked to the use of the fused grains according to the invention in an aqueous-phase forming process since only a limited amount of brucite is detected. Yet, the observations made by the applicant company have shown that the presence of too high a proportion of this phase makes forming in the aqueous phase very difficult, even impossible, as is described below:

The mixture of co-ground powders from example 1 and also the powder of fused grains from example 2 were suspended under conventional aqueous-phase ceramic forming conditions: 60% by weight of ceramic powder were mixed, under magnetic stirring, with 40% by weight of demineralized water. 1 gram of DOLAPIX® dispersant is added per 100 grams of ceramic powder.

In the suspension using the mixture of co-ground powders from example 1 as ceramic powder, a gel then forms. No forming operation was possible using this suspension.

After 45 minutes, the suspension using the powder of fused grains according to example 2 on the contrary did not form a visible gel. A forming of this suspension was able to be carried out without any difficulties.

The invention claimed is:

1. A fused grain essentially composed of a matrix of a magnesium aluminum oxide of $MgAl_2O_4$ spinel structure and/or of the MgO—$MgAl_2O_4$ eutectic structure, and of inclusions essentially composed of magnesium oxide, said grain having the following overall chemical composition, as percentages by weight, expressed in the form of oxides:
   more than 5.0% and less than 19.9% of $Al_2O_3$,
   $Al_2O_3$ and MgO together represent more than 95.0% of the weight of said grain,
   wherein a cumulative content of CaO and of $ZrO_2$ is less than 4000 ppm, by weight, and
   wherein the matrix is composed of separate regions of spinel structure and of the MgO—$MgAl_2O_4$ eutectic structure.

2. The fused grain as claimed in claim 1, wherein $Al_2O_3$ represents more than 8.0% by weight.

3. The fused grain as claimed in claim 1, wherein the cumulative content of CaO and $ZrO_2$ is less than 3000 ppm.

4. The fused grain as claimed in claim 1, wherein the cumulative content of CaO and $ZrO_2$ is less than 2500 ppm.

5. The fused grain as claimed in claim 1, wherein the grain does not comprise an alumina $Al_2O_3$ phase.

6. The fused grain as claimed in claim 1, wherein impurities are present in the grain and include one or more of CaO, $ZrO_2$, $Fe_2O_3$, $SiO_2$, $Na_2O$, and $MnO_2$.

7. The fused grain as claimed in claim 1, comprising less than 2000 ppm of CaO.

8. The fused grain as claimed in claim 1, comprising less than 200 ppm of $ZrO_2$.

9. The fused grain as claimed in claim 1, wherein $Al_2O_3$ and MgO together represent more than 99.0% of the weight of said grain.

10. A mixture of fused grains as claimed in claim 1.

11. A ceramic material obtained by sintering fused grains as claimed in claim 1.

12. The ceramic material as claimed claim 11, comprising inclusions that are each essentially composed of calcium oxide or zirconium oxides or both calcium oxide and zirconium oxide, the number of which is less than 100 per 10 000 square micrometers, on an electron microscopy photograph.

13. A process for manufacturing grains as claimed in claim 1, comprising:
   a) mixing starting materials in order to form a starting feedstock,
   b) melting the starting feedstock until a molten liquid is obtained,
   c) cooling said molten liquid so that the molten liquid is completely solidified to form a solid mass,
   d) grinding said solid mass so as to obtain a mixture of said fused grains.

14. A fused grain essentially composed of a matrix of a magnesium aluminum oxide of $MgAl_2O_4$ spinel structure and/or of the MgO—$MgAl_2O_4$ eutectic structure, and of inclusions essentially composed of magnesium oxide, said grain having the following overall chemical composition, as percentages by weight, expressed in the form of oxides:
   more than 5.0% and less than 19.9% of $Al_2O_3$,
   $Al_2O_3$ and MgO together represent more than 95.0% of the weight of said grain,
   wherein a cumulative content of CaO and of $ZrO_2$ is less than 4000 ppm, by weight, and wherein fine inclusions are present in the grain, each of said fine inclusions being essentially composed of calcium oxide and or zirconium oxide or both calcium oxide and zirconium oxide, a largest dimension of the fine inclusions being less than 2 micrometers.

15. The fused grain as claimed in claim 14, wherein the largest dimension of the fine inclusions fused grain is less than 1 micrometer.

* * * * *